United States Patent [19]

Bowman et al.

[11] 4,073,761

[45] Feb. 14, 1978

[54] POLYETHYLENE EMULSION CONTAINING RESIN BINDER COMPOSITIONS AND PROCESSES

[75] Inventors: Richard C. Bowman, Sanborn; Daniel J. Kay, Williamsville, both of N.Y.

[73] Assignee: Hooker Chemicals & Plastics Corporation, Niagara Falls, N.Y.

[21] Appl. No.: 567,332

[22] Filed: Apr. 11, 1975

Related U.S. Application Data

[63] Continuation-in-part of Ser. No. 174,217, Aug. 23, 1971, abandoned, which is a continuation of Ser. No. 880,408, Nov. 26, 1969, abandoned, which is a continuation-in-part of Ser. No. 818,076, April 21, 1969, abandoned.

[51] Int. Cl.$^2$ .............................................. C08L 61/10
[52] U.S. Cl. .................................... 260/29.3; 164/21; 164/43; 252/49.5; 260/28.5 A; 260/29.6 XA; 260/38; 260/DIG. 40; 428/403
[58] Field of Search ................... 260/38, 28.5 A, 29.3, 260/29.6 XA, 848, DIG. 40; 164/21, 43; 252/49.5

[56] References Cited

U.S. PATENT DOCUMENTS

| | | | |
|---|---|---|---|
| 2,923,989 | 2/1960 | Thomson | 260/DIG. 40 |
| 2,943,068 | 6/1960 | Freedman | 260/19 |
| 3,059,297 | 10/1962 | Dunn et al. | 260/38 X |
| 3,184,814 | 5/1965 | Brown | 260/DIG. 40 |
| 3,306,864 | 2/1967 | Lang | 260/17.2 |
| 3,666,706 | 5/1972 | Hespers | 260/29.6 XA |

FOREIGN PATENT DOCUMENTS

| | | | |
|---|---|---|---|
| 575,901 | 5/1959 | Canada | 260/29.6 XA |

*Primary Examiner*—Theodore E. Pertilla
*Attorney, Agent, or Firm*—Peter F. Casella; James F. Mudd; William G. Gosz

[57] ABSTRACT

Compositions which are useful for binding solid, discrete particles are comprised of a liquid one-step phenol formaldehyde resin, a urea resin component such as urea formaldehyde, an accelerator selected from an acid and a salt of an acid, and an aqueous emulsion of polyethylene. The wet mixtures of the foregoing components exhibit improved flow characteristics in intricate molds. The wet mixtures are useful for molding foundry core compositions and consolidated wood compositions that have improved moisture resistance.

10 Claims, No Drawings

POLYETHYLENE EMULSION CONTAINING RESIN BINDER COMPOSITIONS AND PROCESSES

REFERENCE TO PRIOR APPLICATION

This is a continuation-in-part of copending application Ser. No. 174,217, filed Aug. 23, 1971, now abandoned, which was a continuation of application Ser. No. 880,408, filed Nov. 26, 1969, now abandoned, which was a continuation-in-part of application Ser. No. 818,076, filed Apr. 21, 1969, now abandoned.

BACKGROUND OF THE INVENTION

This invention relates to new and useful improvements in the production of resin binders and accelerators, to the process for applying these materials to discrete, inert solid particles, and to the compositions produced thereby.

Resin binder compositions that have proven commercially successful, especially because of the high cure speeds obtainable when using these compositions, are binder compositions which comprise a liquid one-step phenol formaldehyde resin component such as urea formaldehyde. Such resin binder compositions and the method for using them are disclosed in U.S. Pat. No. 3,306,864, and a particular class of such resin binder compositions is disclosed in detail in U.S. Pat. Nos. 3,539,484 and 3,852,232. Such resin binder compositions have become widely accepted in the foundry industry and are especially desired because of their high cure speeds. However, increasing refinements in this technology are making new demands upon the characteristics of these materials. More intricate patterns for foundry cores require materials having greater ability for the wet mixture of foundry sand, accelerator and resin composition to flow into detailed pattern designs. Industry is also demanding greater moisture resistance of the cured foundry molds and cores.

Accordingly, it is an object of this invention to provide improved resin binders and accelerators which are capable of improving the flow characteristics of wet mixtures of sand containing them. It is a further object of the invention to provide improved resin binders and accelerators and systems which when cured with foundry sand provide molds and cores with improved moisture resistance. These and other objects of the invention will become apparent from a consideration of the following detailed disclosure.

SUMMARY OF THE INVENTION

In accordance with this invention there are provided compositions comprising a liquid one-step phenol formaldehyde resin, a urea resin component selected from the group consisting of a urea formaldehyde and a thiourea formaldehyde, an accelerator selected from the group consisting of an acid and a salt of an acid and aqueous emulsions of polyethylenes. The polyethylene emulsion can be incorporated in the resin components or in the accelerator component, depending on its compatability with these components. The polyethylene emulsions are generally compatible with the liquid resin components and liquid accelerators.

In accordance with a preferred aspect of this invention there is provided a resin binder composition comprising a liquid one-step phenol formaldehyde resin, a urea resin component, such as urea formaldehyde and/or thiourea formaldehyde, and an aqueous emulsion of polyethylene. Further in accordance with the invention there is provided a liquid accelerator comprised of an aqueous solution of an acid or an acid salt, an aqueous emulsion of polyethylene and optionally, urea and/or thiourea. Also in accordance with this invention there are provided resin binder compositions that comprise a liquid one-step phenol formaldehyde resin, a urea resin component, an accelerator selected from the group consisting of acids and acid salts, and an aqueous emulsion of polyethylene.

In accordance with this invention, the foregoing compositions are used to bind discrete solid particles, such as foundry sand and wood particles, to produce molded compositions such as foundry mold and core compositions, and consolidated wood compositions, respectively.

DESCRIPTION OF THE EMBODIMENTS

The phenol formaldehyde resin component of the novel binder is a liquid, water-soluble one-step type which has been partially condensed in a manner well known in the art. For example, formaldehyde and phenol are reacted in proportions equivalent to a molar ratio from about 1:1 to about 3:1 and preferably from about 1.5:1 to about 2.5:1 in the presence of a suitable alkaline catalyst such as sodium hydroxide. The mixture is heated, for example, to a temperature between about sixty and about eighty degrees centigrade, until the reaction is sufficiently complete to yield a resin having a water tolerance or water solubility of preferably at least about 200 percent. However, resins with a water tolerance of at least 50 percent can be used if desired. The water tolerance is preferably in the range of about 200 to about 500 percent to maintain the resin viscosity in an easily workable range. A reaction period of between about two and about 5 hours generally effects this result, but the time will vary with the reaction conditions and the proportions of reactants.

The water solubility or water tolerance of the phenol formaldehyde resin is the amount of water, in weight percent which, when added to the resin, will cause the resulting mixture to become turbid, as measured by the Smith Turbidimeter. This procedure is described more fully in U.S. Pat. Nos. 3,306,864, 3,539,485 and 3,852,232.

Various modifications of the above procedure for preparing the one-step phenol formaldehyde resin can be employed. For example, all or part of the phenol can be replaced with similar phenolic compounds such as cresol, xylenol, cresylic acid, and mixtures thereof. Other catalysts include other alkali metal hydroxides, amines, sodium carbonate, sodium bisulfite, and the like. The aqueous liquid phenol formaldehyde resin can be partially dehydrated to a desired solids content.

The term "urea resin component" as used throughout the specification and claims include: (1) urea-formaldehyde compositions, and (2) thiourea-formaldehyde compositions, per se; as well as (3) urea-formaldehyde or thiourea-formaldehyde compositions resulting from the reaction of urea or thiourea with urea- and thiourea-formaldehyde compositions and/or with additional formaldehyde during the course of the preparation of the resinous composition. The molar ratio of urea to formaldehyde in the urea resin component should be about 1:1 to about 1:5, preferably about 1:2 to about 1:5.

Urea- and thiourea-formaldehyde compositions can be prepared by reacting urea and/or thiourea and formaldehyde in a molar ratio of from about 1:1 to about 1:5, respectively. The reaction temperature is generally in the range of 25° to 125° centigrade, although higher and lower temperatures can be used. The pH of the reaction mixture is regulated in the range of about 3 to 9.5, with the lower value of pH being used at the lower reaction temperatures and the higher value of pH at the higher reaction temperatures. The reaction is continued for a period of about one to four hours depending on the degree of reaction desired, since from one to four molecules of formaldehyde can be reacted with each molecule of urea. The completion of the desired reaction is conveniently determined by monitoring the viscosity of the reaction mixture. The final products are usually in liquid form and are conveniently used as such in the instant invention. However, in some cases it may be desirable to convert the product to a solid form by drying. One such product that is commercially available is dimethylol urea.

The urea resin component of the novel binder can be combined with the phenolic component by a number of procedures. First, the urea resin component can be admixed with the phenol formaldehyde resin after completion of the phenolic reaction. In a second method a urea resin component, such as a urea-formaldehyde precondensate is introduced into a reactor, followed by addition of phenol and then formaldehyde, and optionally additional urea, so that the phenolic reaction occurs in the presence of the urea component, as described in U.S. Pat. No. 3,539,484. In still a third method, the phenolic component is introduced into a reactor, followed by addition or urea and then formaldehyde so that the preparation of the urea resin component occurs in the presence of the phenolic component. Other variations in the reaction sequence can be employed without departing from the scope of the invention. Thus, the urea resin component can be a dimethylol urea composition which can be added to the phenol formaldehyde resin as a finely divided solid, but is preferably added as an aqueous solution. In still another variation, a mixture of the phenolic component and urea resin component can be provided by one of the foregoing procedures, and in the course of mixing the resin components with the inert solid particles in accordance with the invention, additional urea can be added to the mixture of resin components and solid particles. Such additional urea is conveniently introduced in admixture with the accelerator, and reacts with uncombined formaldehyde in the urea resin component. It is apparent that many variations are possible to attain the desired ratios of the phenolic component, urea resin component and accelerator.

In preparing the above-desired resinous compositions of the invention, the components are employed to provide a composition having a molar ratio of phenol plus urea and/or thiourea to formaldehyde of about 1:1.3 to about 1:4.8 and a urea and/or thiourea content of about 4 to 25 weight percent.

Suitable acidic curing accelerators for use in the invention when employing the resin binder compositions of the invention with inert filler particles, include aqueous solutions of strong mineral acids, such as hydrochloric acid, sulfuric acid, phosphoric acid, nitric, and the like. Organic acids such as maleic acid, toluene sulfonic acid, oxalic acid, fumaric acid, acetic acid, glycolic acid, sulfamic acid, boric acid, citric acid, and the like, are also satisfactory. Other desirable accelerators include the ammonium salts of strong mineral acids and the organic acids, such as ammonium chloride, ammonium nitrate, ammonium sulfate, monoammonium sulfate, monoammonium phosphate, diammonium phosphate, triammonium phosphate, ammonium acetate, ammonium sulfamate, ammonium borate, ammonium citrate, and mixtures thereof. In addition, the ammonium salts can be formed in situ by introducing into the resin components, the compounds capable of forming the ammonium salts. For example, acetic acid and ammonium hydroxide can be added to the mixture of resin and solid inert particles to form ammonium acetate in situ. Other salts, such as ferric chloride, zinc chloride and iron ammonium sulfate can be employed. The accelerator can be used in preparing the compositions of the invention in an aqueous solution. Especially preferred for use in liquid accelerators is ammonium nitrate. The proportion of accelerator to the resinous binder composition is generally in the range of about 0.5 to about 30 weight percent, and is preferably in the range of about 1 to about 10 weight percent based on the total resin component solids.

In accordance with the invention, an aqueous emulsion of polyethylene is combined with the resinous binder comprised of the liquid one-step phenol formaldehyde resin and the urea resin component. When a liquid accelerator is employed, the aqueous emulsion of polyethylene can be combined with the liquid accelerator. The polyethylenes employed in the aqueous emulsions have a density of about 0.91 to about 0.94. The molecular weight is generally in the range of about 1,000 to 30,000, but is preferably in the range of about 10,000 to about 20,000. The melting point is at least about 50° C., preferably about 100° to 200° C. The polyethylene can be emulsified in water with the aid of either an anionic or a non-ionic emulsifying agent. Suitable non-ionic emulsifying agents include the alkylphenoxypoly(ethylenoxy)ethanols, and the dialkylphenoxypoly(ethyleneoxy)ethanols, preferably those wherein the alkyl substituent has 5 to 12 carbon atoms and which have 1 to 20 ethyleneoxy groups. Typical members are octylphenoxypoly(ethyleneoxy)ethanol, nonylphenoxypoly(ethyleneoxy)ethanol and dodecylphenoxypoly(ethyleneoxy)ethanol. Also useful are fatty acid esters of polyhydric alcohols or ether alcohols, for example, glycerol mono-stearate; esters of ethylene glyocl, diethylene glycol, tirethylene glycol and polyethylene glycol, for example, the condensation product of oleic acid with ethylene oxide; and fatty esters of sugar alcohols. Suitable anionic emulsifying agents include the alkali metal alkylbenzene sulfonates, particularly those wherein the alkali metal is sodium or potassium and the alkyl group has 8 to 20 carbon atoms. Typical members are sodium dodecylbenzene sulfonate and potassium dodecylbenzene sulfonate. Another suitable group of anionic emulsifying agents is the alkali metal alkyl sulfates, particularly those wherein the alkali metal is sodium or potassium and the alkyl group has 8 to 20 l carbon atoms. A typical member is sodium lauryl sulfate. Also useful are the sulfonated aliphatic polyesters, free acids of complex phosphate esters, sodium salts of complex phosphate esters and sodium salt of disproportionated wood rosin. Another suitable group of anionic emulsifying agents is the alkali metal lignin sulfonates, such as sodium lignin sulfonate and potassium lignin sulfonate.

The aqueous emulsions of polyethylene generally contain about 10 to 70 weight percent solids and preferably about 30 to 60 weight percent solids.

The polyethylene emulsion is generally used in a proportion of about 0.3 to about 5 weight percent, preferably about 0.5 to about 2 weight percent based on the resinous components (phenol-formaldehyde resin and urea resin component). When the polyethylene emulsion is incorporated in the liquid accelerator, it is employed in a proportion of about 1 to about 10 percent, preferably about 2 to about 8 weight percent based on the weight of the composition.

The resin components, accelerator and additives of the invention can be combined with the discrete, inert solid particles by several procedures, For example, a portion of foundry sand can be introduced into a commercial muller or other suitable mixer. The accelerator can be added to the sand and mixed for 0.5 to 5 minutes. Thereafter, the resin components can be added and mixed for 0.5 to 5 minutes to provide a "wet mixture" suitable for use in subsequent production of foundry cores. Alternatively, the resin components can be added to the sand first, followed by the accelerator. The resin components and accelerator can be premixed prior to the introduction to the sand, although this procedure is less preferred. Also, as indicated hereinbefore, a mixture of resin components can be introduced to the sand, followed by a mixture of accelerator and urea to provide for the reaction of additional urea with combined formaldehyde in the resin components.

The proportion of the entire resin binder composition (phenol-formaldehyde resin, urea resin component, accelerator and additives) added to the discrete solid particles is generally between about 0.2 and about 5 percent and is preferably between about 0.5 and about 4 percent of resin solids based on the weight of particles.

When foundry sand is employed as the discrete solid particles, the resulting wet mixture is suitable for foundry use in the preparation of foundry cores and molds. The curing time of the wet mix depends on the concentration of the binder composition, the temperature conditions and the amount and type of accelerator employed. The cure time can be as little as about 3 seconds, and in some instances can range as high as 2 minutes. The curing time should be sufficient for the core to attain the strength required for it to support its own weight, and to facilitate its removal from the core box without injury. The wet mixture can be used in the hot box process wherein the core box or pattern is preheated prior to introduction of the wet mixture. The temperature of the core box or mold is generally about 300° to 500° F., but higher or lower temperatures can be employed if desired. After the core is removed from the core box it is allowed to stand at room temperature. The residual heat in the core causes the binder in the interior of the core to cure and produces consolidation of the discrete particles. The heating of the wet mixture can also be accomplished by passing heated gas through the wet mixture in the core box or pattern. The core box can be preheated to a temperature from about 75° to about 300° F., usually in the range of about 150° to about 250° F. The heated gas can be air, nitrogen, oxygen, carbon dioxide, or other inert gases, and is preferably air; and is generally employed at a temperature in the range of about 100° to about 700° F., preferably about 100° to about 450° F. The heated gas or warm box process results in more efficient curing than obtained in the hot box process in that the curing is more uniform throughout the core. The improved curing results in the production of less noxious fumes and very rapid development of hot tensile strength. The heated air process has been observed to produce cleaner castings. Also there is less deformation of the cast metal products so that closer tolerances are possible. While the foregoing discussion has referred to the production of sand cores, it is understood to also apply to the production of sand molds and miscellaneous sand products.

In addition to foundry sand per se, the aggregate material used in producing the foundry products of the invention can include such material as fire clay, flyash, iron oxide, cereal, pitch, and the like. However foundry sand of various grades are most commonly employed.

The compositions and processes of the invention can be used in the preparation of consolidated wood compositions containing wood particles. Thus, the discrete particles employed in preparing the wet mixture can be wood chips, flakes or other wood waste particles. The resulting wet mix can be pressed into boards or other desired shapes, then heated to temperatures of about 300° to 500° F. until the resin is cured. The resulting boards have high strength and good water resisting properties. When wood particles are treated in accordance with the invention, the proportion of resinous binder is generally about 2 to about 20 percent and is preferably about 5 to about 20 percent of resin solids based on the weight of the wood particles.

The following examples are presented for the purpose of illustrating the invention more fully without any intention of limiting it thereby. Unless indicated otherwise in this specification and claims, all parts and percentages are by weight and temperatures are in degrees centigrade.

EXAMPLE 1

A resin binder was prepared as follows: 251 parts by weight of a urea formaldehyde concentrate comprised of 42.6 percent formaldehyde, 29 percent urea and 28.4 percent water having a pH of about 8 was heated and held at reflux temperature for 30 minutes. Then the reaction mixture was cooled and the pH was adjusted to about 5.5 by the addition of a small amount of glacial acetic acid. The reaction mixture was heated to about 80 degrees centigrade for 30 minutes. Thereafter 3.5 parts of a 50 percent aqueous solution of sodium hydroxide, 100 parts of phenol and 175 parts of a 37.2 weight percent aqueous solution of formaldehyde were added to the reaction mixture which was then heated to about 80 degrees centigrade for 35 minutes, and heated rapidly to the reflux temperature of greater than 100 degrees centigrade and held for 10 minutes. With the water solubility of the resin composition below 350 percent, the reaction product was vacuum dehydrated at 27–28 inches of mercury vacuum and at a temperature in the range of 45 to 60 degrees centigrade until the refractive index of the resin product was about 1.530. The pH of the product was adjusted to about 7.0 by the addition of a small amount of a 50 percent aqueous aluminum chloride solution.

A solid accelerator was prepared by blending 38.8 parts of ammonium chloride, 58.3 parts of urea and 2.9 parts of diatomaceous earth.

20 pounds of Grand Haven Bank foundry sand were added to a muller. Then, 22.8 grams of water were added to the sand in the muller and the mixture was mulled for one-half minute. Then 21.8 grams of the above-described accelerator were added to the mixture and mulled for 1.5 minutes. Thereafter, 182 grams of the above-described resin were added to the mixture in the muller and mulling was continued an additional 2 minutes. 45.5 grams of fly ash and 25.5 grams of fireclay were added to the wet sand and mulled for 1.5 minutes and 5.5 grams of core oil were added and the mulling was continued an additional one-half minute to provide a wet mixture of the above-described components. The wet mixture was discharged from the muller and blown into patterns in the form of "dog bone" test specimens which had been pre-heated to a temperature of 400° F. 9 cured specimens were prepared by holding the wet mixture in the pattern for a dwell time of 10 seconds, and 9 additional test specimens were cured for 20 seconds. The test specimens were allowed to stand for 20 minutes. Then, 3 specimens each of the specimens that had been cured for 10 and 20 seconds were individually weighed, immersed in water at 25° C for exactly 10 seconds, shaken to remove excess surface water, again weighed and then tested for tensile strength on a model 612 Dietert tensile tester. Results for each of the 2 sets of 3 specimens were averaged and the average results are shown in Table 1. The gain in weight of the specimens represents the amount of water picked-up by the specimen during immersion. The less moisture resistant materials pick-up more water.

3 specimens each of the specimens that had been cured for 10 and 20 seconds were individually weighed, immersed in water at 25° C for exactly 10 seconds, shaken to remove excess surface water and then laid upright (on the one inch side of the specimen) on a one-eighth inch think brass plate. The specimens were spaced on the plate no closer than 2 inches apart. All the specimens on the brass plate were placed in a circulating hot air oven at 350°–400° F. for 20 minutes. Thereafter, the specimens were removed from the oven and cooled for 30 minutes, each specimen was weighed and then tested for tensile strength on the model 612 Dietert tensile tester. The results from each set of 3 specimens were averaged and these results are shown in Table 1 for Example 1. The loss in weight of the specimens represents the amount of water lost during re-drying. The less moisture resistant materials pick-up more water during immersion and then lose this water during the drying step. It was observed that the specimens that had been cured 10 seconds were wet on the inside even after the oven drying step. Specimens cured for 20 seconds cracked in the oven. 3 specimens each of the specimens that had been cured for 10 and 20 seconds were individually weighed and tested for tensile strength on the model 612 Dietert tensile tester. The results for these control specimens are also shown in Table 1. It was found that the average tensile strength of the control specimens was 257 and 315 pounds per square inch for the specimens that had been cured for 10 and 20 seconds, respectively.

Specimens that had been cured for 10 seconds were found to have an average tensile strength of 70 and 20 pounds per square inch following the water immersion and oven redrying tests, respectively. Specimens that had been cured for 20 seconds had tensile strengths of 211 and 196 pounds per square inch after the water immersion and oven drying test, respectively. These tests simulate actual foundry practice wherein the cured foundry cores are treated with an aqueous core wash and then redried in an oven and indicate that the molded compositions exemplified in this comparative example would not perform well in actual foundry practice.

EXAMPLE 2

The procedure of Example 1 was repeated utilizing the same materials proportions and conditions, except that no core oil was employed in the wet mixture and the resin was mulled for 2.5 minutes to keep the total mulling cycle at 6 minutes. The water immersion and oven redrying tests were performed on the cured specimens, and the results are shown in Table I. It was found that of the 3 specimens that had been cured for 10 seconds, 2 of the specimens broke in the oven during the oven redrying test. All 3 of the specimens that had been cured for 20 seconds broke in the oven redrying test.

EXAMPLE 3

The procedure of Example 2 was repeated using the same materials, proportions and conditions, except that 1.8 grams of a polyethylene emulsion having the characteristics shown in Table II under column A were physically mixed with the resin prior to introduction of the resin to the muller. Results of the water immersion and oven re-drying tests are shown in Table I for the specimens that had been cured for 10 and 20 seconds. In the oven re-dry tests, it was found that the specimens that had been cured for 10 seconds were soft in the center of the specimen after oven drying. The specimens that had been cured for 20 seconds showed no ill effects of the water treatment following the oven drying step. Also, it is noteworthy that the 20 second cure specimens that were re-dried had an average tensile strength greater than the comparable specimens that had neither been water treated or re-dried.

EXAMPLE 4

The procedure of Example 3 was repeated using the same materials, proportions and conditions, except that 2.3 grams of the polyethylene emulsion employed in Example 3 were physically mixed with the resin prior to its introduction into the muller. The results of the water immersion and oven re-drying tests are shown in Table

TABLE I

| Example No. | 1 | | 2 | | 3 | | 4 | | 5 | |
| --- | --- | --- | --- | --- | --- | --- | --- | --- | --- | --- |
| Cure Time, seconds | 10 | 20 | 10 | 20 | 10 | 20 | 10 | 20 | 10 | 20 |
| Control Data | | | | | | | | | | |
| Weight speciman,g | 104.8 | 104.2 | 103.8 | 103.7 | 105.1 | 104.6 | 104.8 | 104.8 | 104.6 | 104.4 |
| Tensile strength, psi | 257 | 315 | 246 | 358 | 185 | 270 | 241 | 337 | 210 | 310 |
| Water Immersion Data | | | | | | | | | | |
| Weight before immersion,g | 104.5 | 104.8 | 103.8 | 103.6 | 104.7 | 104.4 | 104.8 | 105.0 | 104.6 | 104.7 |
| Weight after immersion,g | 115.3 | 111.6 | 117.1 | 118.1 | 112.4 | 108.8 | 109.6 | 107.8 | 107.2 | 107.5 |
| Gain in weight,g | 10.8 | 6.8 | 13.3 | 14.5 | 7.7 | 4.4 | 5.8 | 2.8 | 2.6 | 2.8 |
| Tensile strength,psi | 70 | 211 | 81 | 208 | 70 | 188 | 107 | 253 | 185 | 220 |
| Oven Re-dry Data | | | | | | | | | | |
| Weight after immersion,g | 115.6 | 111.4 | 118.2 | 120.3 | 111.7 | 109.4 | 107.8 | 106.4 | 107.1 | 106.2 |
| Weight after drying,g | 106.5 | 104.7 | 104.4 | 104.8 | 105.4 | 104.8 | 104.4 | 104.6 | 104.4 | 104.1 |
| Loss in weight,g | 9.1 | 6.7 | 13.8 | 15.5 | 6.3 | 4.6 | 3.4 | 1.8 | 2.7 | 2.1 |
| Tensile strength,psi | 20 | 196 | 85 | — | 108 | 320 | 391 | 505 | 306 | 463 |

I. It was found that all test specimens had excellent tensile strength after the oven drying test and that the interior of the specimens were in good condition after this step.

EXAMPLE 5

The procedure of Example 3 was repeated using the same materials, proportions and conditions except that 2.7 grams of the polyethylene emulsion of Example 3 were physically mixed with the resin prior to its introduction into the muller. The results of the water immersion and oven drying tests are shown in Table I. It was observed that the tensile strengths of the specimens that had been water treated and redried were superior to the control specimens. The interior of all test specimens was in good condition after the oven re-drying step.

The moisture resistance of the compositions of Examples 3, 4 and 5 is indicated by less susceptibility to pickup moisture during immersion, and by improvement in tensile strength, especially compared to the results of Examples 1 and 2.

In actual foundry practice, it was observed that when the wet mixtures of Examples 3, 4 and 5 were blown into a pattern having a very intricate design, the wet mixture flowed evenly and completely filled out the mold, showing the superior flow properties of these wet mixtures when used in a foundry process. By contrast, the wet mixture of Example 1 when used in a pattern having a very intricate design did not flow evenly nor completely fill out the mold, despite the fact the composition contained a core oil. The wet mixture of Example 2 was less suitable than the wet mixture of Example 1 in flowing evenly and filling out the mold completely.

EXAMPLE 6

A polyethylene emulsion of this invention was employed in a liquid accelerator, rather than with the liquid resin as in Examples 3, 4 and 5. The liquid accelerator was prepared by thoroughly mixing 36.3 parts of water, 37.7 parts of urea, 21.0 parts of ammonium nitrate and 5.0 parts of a 50 percent aqueous aluminum chloride solution at a temperature of 40° C until all components were dissolved. Then, the solution was cooled to room temperature, 2.0 parts of the polyethylene emulsion having the characteristics described in Table II under column B were thoroughly mixed into the solution. Thereafter, the liquid accelerator was employed using the procedure of Example 2 to produce a wet mixture having excellent flow characteristics, which was then employed to provide cured molded specimens having good moisture resistance.

EXAMPLE 7

The procedure of Example 5 is repeated using the same materials, proportions and conditions except that the resin component comprised a physical mixture of 15 parts of a liquid one-step phenol formaldehyde resin having a water tolerance of 300 percent and 65 percent dissolved solids and 15 parts of an aqueous solution of urea formaldehyde comprised of 25 percent urea, 60 percent formaldehyde and 15 percent water. The resulting wet mixture with sand has excellent flow properties and is employed to provide cured molded specimens having good water resistance.

TABLE II

| Emulsion Characteristics | A | B |
|---|---|---|
| Total Solids, %* | 40.8 | 40.6 |
| Total Emulsifier, % | 6.60 (anionic) | 5.21 (non-ionic) |
| pH | 4.95 | 7.68 |
| Viscosity, Brookfield, centipoises (25° C., Spindle No. 1, 6RPM) | 14 | 82 |
| Particle size | Less than 0.1 micron | Less than 0.1 micron |
| Specific Weight, pounds per gallon | 8.1 | 8.1 |
| *Polyethylene Characteristics | | |
| Density, grams/cu. cm. | 0.910 | 0.920 |
| Inherent viscosity (0.2% polymer in tetralin at 135° C.) | 0.46 | 0.63 |
| Apparent average molecular weight (Inherent viscosity determination) | 16,000 | 18,000 |
| Melting Point, ° C. (Modified ring & ball method) | 124.0 | 109.0 |

EXAMPLE 8

A resin binder was prepared as follows: 127 parts by weight of a urea-formaldehyde composition comprised of 60 percent formaldehyde, 25 percent urea and 15 percent water, and 69.8 parts of a 37.2 weight percent aqueous solution of formaldehyde were added to a reaction vessel. While agitating the mixture, 42.8 parts of shotted urea were added and the mixture was heated to 40–45° centigrade and held in that temperature range until all the urea was dissolved. Thereafter, a small amount of an aqueous solution of glacial acetic acid was introduced to the reaction mixture to reduce the pH to about 5.5. The reaction mixture was rapidly heated and held in the temperature range of 80–85° centigrade for 35 minutes. Thereafter, 3.5 parts of a 50 percent aqueous solution of sodium hydroxide, 100 parts of phenol and 188.3 parts of a 37.2 weight percent aqueous solution of formaldehyde were added to the reaction mixture which was then heated to about 80 degrees centigrade and held in that temperature range for 35 minutes. The reaction mixture was heated rapidly to the reflux temperature of greater than 100 degrees centigrade (about 100–105° C), held at that temperature for 9 minutes and then cooled. With the water solubility of the resin composition below 250 percent, the reaction product was vacuum dehydrated at 27-28 inches of mercury vacuum and at a temperature in the range of 45 to 60 degrees centigrade until the refractive index of the resin binder composition was about 1.530. The pH of the product was adjusted to about 7.0 by the addition of a small amount of a 50 percent aqueous aluminum chloride solution. The final resin properties were: 165° C hot plate cure of 70–75 seconds; free formaldehyde content of 6%; specific gravity 1.30; viscosity at 25° C of 1575; ASTM solids content of 70.5; water tolerance of 155%; refractive index of $N_D$ 1.5297 at 25° C and nitrogen content of 9.9%.

A liquid accelerator was prepared by blending 45 parts of water, 30.6 parts of urea, 16.5 parts of ammonium nitrate and 4 parts of ethylene diamine. Under agitation, the mixture was heated to 40°–45° centigrade and held in that temperature range until all components were dissolved. Thereafter, 3.9 parts of a polyethylene emulsion having the characteristics shown in Table II under column B were thoroughly mixed in with the other components. (This accelerator will hereafter be referred to as Accelerator A.)

7 pounds of Lake Shore foundry sand were added to a muller. Then, 19.1 grams of Accelerator A were added to the sand in the muller and the mixture was mulled for 2 minutes. Then 63.6 grams of the above-described resin binder composition were added to the mixture and mulled for 3 minutes. The resulting wet mixture was discharged from the muller and blown into patterns in the form of "dog bone" test specimens. The pattern had been pre-heated to a temperature of 200° F. Air at a pressure of 60 pounds per square inch gauge was heated to 350° F. and blown through the patterns to cure the resin binder compositions. 9 cured specimens were prepared by holding the wet mixture in the pattern in contact with the hot air for a dwell time of 10 seconds, and 9 additional test specimens were cured in the same manner for 30 seconds. The test specimens were allowed to stand for 20 minutes and then were processed as described in Example 1. The following results were obtained:

TABLE III

| Cure Time, seconds | 10 | 30 |
|---|---|---|
| Control Data | | |
| Weight specimen, g | 96.7 | 96.8 |
| Tensile strength, psi | 382 | 360 |
| Water Immersion Data | | |
| Weight before immersion, g | 96.9 | 97.0 |
| Weight after immersion, g | 100.7 | 98.3 |
| Gain in weight, g | 3.8 | 1.3 |
| Tensile strength, psi | 343 | 353 |
| Oven Re-dry Data | | |
| Weight after immersion, g | 99.6 | 98.7 |
| Weight after drying, g | 96.3 | 97.2 |
| Loss in weight, g | 3.3 | 1.5 |
| Tensile strength, psi | 310 | 317 |

The foregoing results showed that the compositions exhibited good moisture resistance.

EXAMPLES 13 TO 18

Accelerator compositions were prepared as follows:

Accelerator B 38.75 parts of water, 28.5 parts of shotted urea and 28.0 parts of ammonium nitrate were mixed and heated to 45°–50° centigrade until all components were dissolved. While cooling the resulting mixture, 4.75 parts of a polyethylene emulsion having the characteristics shown in Table II under column A were thoroughly mixed with the other components.

Accelerator C 50 parts of p-toluenesulfonic acid were heated to about 50° centigrade, after which 50 parts of ethanol were added slowly to the acid with constant agitation until the reaction was completed.

Accelerator D 41.3 parts of shotted urea were slowly added to 58.7 parts of a 38 weight percent aqueous solution of hydrochloric acid at a temperature of about 30° centigrade until all the urea was dissolved.

In Examples 13 through 18, 20 pounds of Lake Shore foundry sand were added to a muller. Then, a first accelerator was added to the sand in an amount corresponding to 20 weight percent of the resin and the mixture was mulled for 1 minute. Then a second accelerator was added to the mixture and mulling was continued for 1.5 to 2 minutes. Thereafter, the resin of Example 8 was introduced to the muller in an amount corresponding to 2 weight percent of the sand and the components were mulled for an additional 3 minutes. The resulting wet mixture was discharged from the muller and blown into patterns in the form of "dog bone" test specimens. The patterns had been preheated. Air at a pressure of 60 pounds per square inch gauge was passed through a heater and raised to an elevated temperature and then passed through the wet mixture in the core box. With each wet mixture, a series of cured specimens were prepared by holding the wet mixture in the pattern in the presence of the hot air for dwell times of 5, 10, 15, 20, 30 and 60 seconds. For each of these conditions, a series of specimens were removed from the patterns and immediately tested for "hot" tensile strength. An additional series of specimens were removed from the patterns, allowed to stand for 20 minutes to cool and were then tested for "cold" tensile strength. The results of these tests are shown in Table IV together with the identification of the accelerators employed, the proportion of the accelerator, heated air temperature, and pattern temperature.

Various modifications can be made in the invention without departing from the spirit thereof. Therefore, this specification is intended to illustrate the invention but not to limit it.

TABLE IV

| Example No. | 13 | 14 | 15 | 16 | 17 | 18 |
|---|---|---|---|---|---|---|
| First Accelerator | A | A | A | A | B | B |
| Wt. % on Resin | 20 | 20 | 20 | 15 | 20 | 20 |
| Second Accelerator | C | D | C | C | C | D |
| Wt. % on Resin | 6.9 | 5 | 6.9 | 12 | 6.9 | 5 |
| Air Temperature, ° F. | 300 | 300 | 225 | 300 | 300 | 300 |
| Pattern Temperature, ° F. | 100 | 100 | 100 | 100 | 100 | 100 |
| Hot Tensile Strength, psi | | | | | | |
| Cure Time  5 seconds | — | — | — | — | — | — |
| 10 seconds | — | — | — | — | 80 | 105 |
| 15 seconds | 140 | 290 | 80 | 95 | 130 | 170 |
| 20 seconds | 190 | 275 | 75 | 130 | 190 | 190 |
| 30 seconds | 235 | 325 | 115 | 180 | 185 | 215 |
| 60 seconds | 375 | 450 | 265 | 265 | 300 | 275 |
| Cold Tensile Strength, psi | | | | | | |
| Cure Time  5 seconds | 195 | 205 | — | 155 | 225 | 245 |
| 10 seconds | 430 | 255 | 270 | 310 | 200 | 265 |
| 15 seconds | 420 | 395 | 310 | 335 | 250 | 295 |
| 20 seconds | 440 | 455 | 290 | 330 | 275 | 320 |
| 30 seconds | 440 | 430 | 300 | 350 | 340 | 255 |
| 60 seconds | 465 | 455 | 340 | 375 | 355 | 390 |

We claim:
1. A composition consisting essentially of a mixture of (1) an aqueous emulsion of polyethylene, (2) an aqueous solution of a compound selected from the group consisting of a strong mineral acid, an organic acid, an ammonium salt of a strong mineral acid and an ammonium salt of an organic acid, and (3) a compound selected from the group consisting of urea, thiourea, and mixtures thereof.

2. The composition of claim 1 wherein said compound comprises ammonium nitrate.

3. The composition of claim 1 wherein the emulsion of polyethylene contains about 10 to about 70 weight percent solids and is in a proportion of about 1 to about 10 weight percent based on the weight of said composition.

4. In a binder composition comprising (a) a resinous binder and (b) an accelerator, wherein the resinous binder comprises a one-step phenol-formaldehyde resin and a urea resin component selected from the group consisting of a urea-formaldehyde resin and a thiourea-formaldehyde resin, wherein the improvement comprises the accelerator consisting essentially of a mixture of (1) an aqueous emulsion of polyethylene, (2) an aqueous solution of a compound selected from the group consisting of a strong mineral acid, an organic acid, an ammonium salt of a strong mineral acid and an ammonium salt of an organic acid, and (3) a compound selected from the group consisting of urea, thiourea, and mixtures thereof.

5. The composition of claim 4 wherein the polyethylene emulsion contains about 10 to about 70 weight percent solids and is in a proportion of about 0.3 to about 5 weight percent based on the resinous components.

6. The binder composition of claim 4 wherein the compound is ammonium nitrate.

7. In a process of bonding discrete, solid inert particles with a binder composition comprising (a) a resinous binder and (b) an accelerator to produce a wet mixture and heating the wet mixture to effect setting of the components, said resinous binder comprising a one-step phenol-formaldehyde resin and a urea resin component selected from the group consisting of a urea-formaldehyde resin and a thiourea-formaldehyde resin, wherein the improvement comprises the accelerator consisting essentially of a mixture of (1) an aqueous emulsion of polyethylene, (2) an aqueous solution of a compound selected from the group consisting of a strong mineral acid, an organic acid, an ammonium salt of a strong mineral acid, and an ammonium salt of an organic acid, and (3) a compound selected from the group consisting of urea, thiourea, and mixtures thereof.

8. The process of claim 7 wherein the discrete, solid inert particles comprise foundry sand.

9. The process of claim 7 wherein the emulsion of polyethylene contains about 10 to about 70 weight percent solids and is in a proportion of about 1 to about 10 weight percent based on the weight of said composition.

10. The process of claim 7 wherein the compound comprises ammonium nitrate.

* * * * *